(12) United States Patent
Kim

(10) Patent No.: US 11,474,448 B2
(45) Date of Patent: Oct. 18, 2022

(54) TONER REFILL KITS GENUINENESS AUTHENTICATION USING ELECTRICAL SIGNALS

(71) Applicant: HEWLETT-PACKARD DEVELOPMENT COMPANY, L.P., Spring, TX (US)

(72) Inventor: Sang Woo Kim, Pangyo (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 98 days.

(21) Appl. No.: 17/047,106

(22) PCT Filed: Dec. 3, 2018

(86) PCT No.: PCT/KR2018/015169
§ 371 (c)(1),
(2) Date: Oct. 13, 2020

(87) PCT Pub. No.: WO2020/022583
PCT Pub. Date: Jan. 30, 2020

(65) Prior Publication Data
US 2021/0356883 A1 Nov. 18, 2021

(30) Foreign Application Priority Data
Jul. 25, 2018 (KR) .......................... 10-2018-0086839

(51) Int. Cl.
*G03G 15/08* (2006.01)
*G03G 21/00* (2006.01)
(Continued)

(52) U.S. Cl.
CPC ..... *G03G 15/0863* (2013.01); *G03G 15/0894* (2013.01); *G06F 21/44* (2013.01); *H04L 9/30* (2013.01); *H04L 9/3234* (2013.01)

(58) Field of Classification Search
CPC .............. G03G 15/08; G03G 15/0863; G03G 15/0894; G03G 21/1676; G06F 21/33;
(Continued)

(56) References Cited

U.S. PATENT DOCUMENTS 5,886,719 A * 3/1999 Zepeda .................... B41J 2/175
347/85
6,418,283 B1 7/2002 Wegman et al.
(Continued)

FOREIGN PATENT DOCUMENTS

JP 2004093600 3/2004

*Primary Examiner* — Sophia S Chen
(74) *Attorney, Agent, or Firm* — Trop Pruner & Hu, P.C.

(57) ABSTRACT

An image forming device and a method of operating an image forming device are provided. The method includes detecting a coupling of a first toner refill kit to an image forming device, obtaining, based on a first electrical signal generated in the first toner refill kit, first authentication data corresponding to the first electrical signal, obtaining a first authentication key used to authenticate the first toner refill kit from the first authentication data, applying the first authentication key to a predetermined criterion used to determine validity of an authentication key of a toner refill kit to confirm whether the first toner refill kit is genuine, and controlling a toner refilling operation of the first toner refill kit based on whether the first toner refill kit is genuine.

20 Claims, 11 Drawing Sheets

(51) Int. Cl.
  *G06F 21/44*  (2013.01)
  *H04L 9/30*  (2006.01)
  *H04L 9/32*  (2006.01)

(58) Field of Classification Search
  CPC . G06F 21/44; G06F 21/84; H04L 9/30; H04L 9/3234
  See application file for complete search history.

(56) References Cited

U.S. PATENT DOCUMENTS

| | | |
|---|---|---|
| 6,862,420 B1 | 3/2005 | Less |
| 2002/0008735 A1* | 1/2002 | Lee .................. G03G 15/104 347/85 |
| 2004/0086290 A1 | 5/2004 | Brenner |
| 2004/0120725 A1 | 6/2004 | Wachter et al. |
| 2006/0023249 A1 | 2/2006 | Simpson |
| 2009/0232548 A1 | 9/2009 | d'Entrecasteaux |
| 2011/0093702 A1 | 4/2011 | Eom et al. |
| 2011/0211850 A1 | 9/2011 | Kim |
| 2017/0032135 A1 | 2/2017 | Refstrup |

* cited by examiner

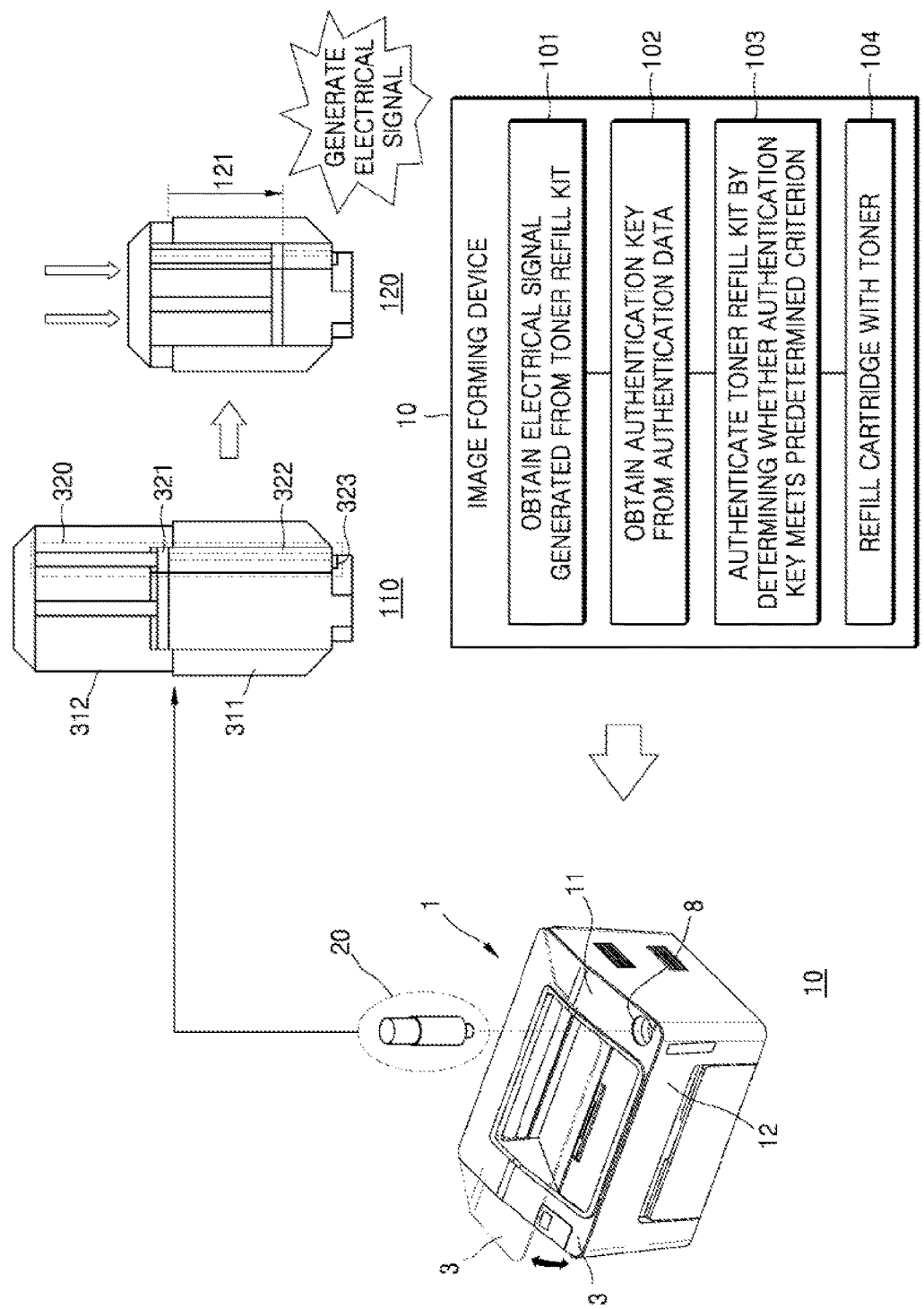

[Fig. 2]
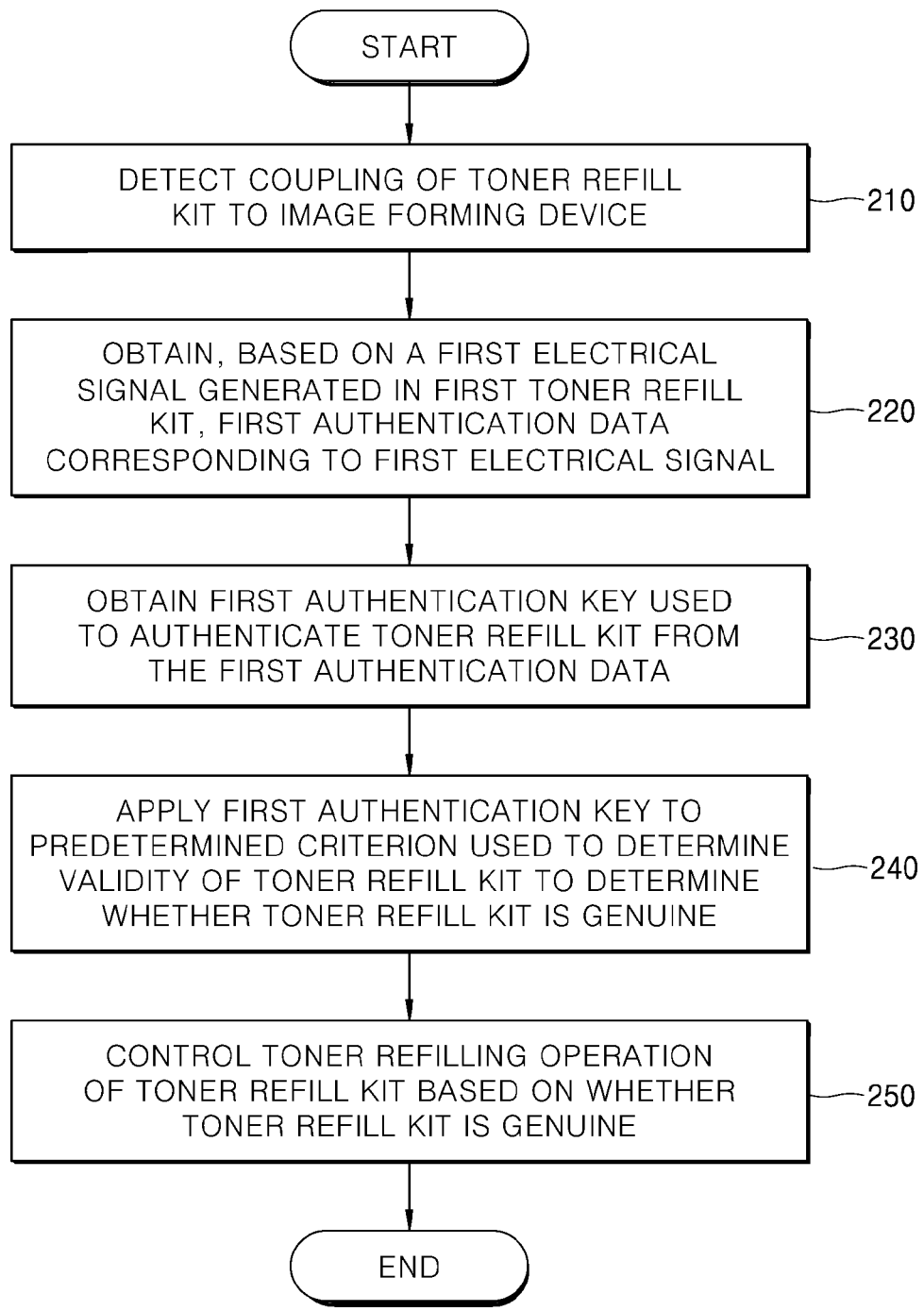

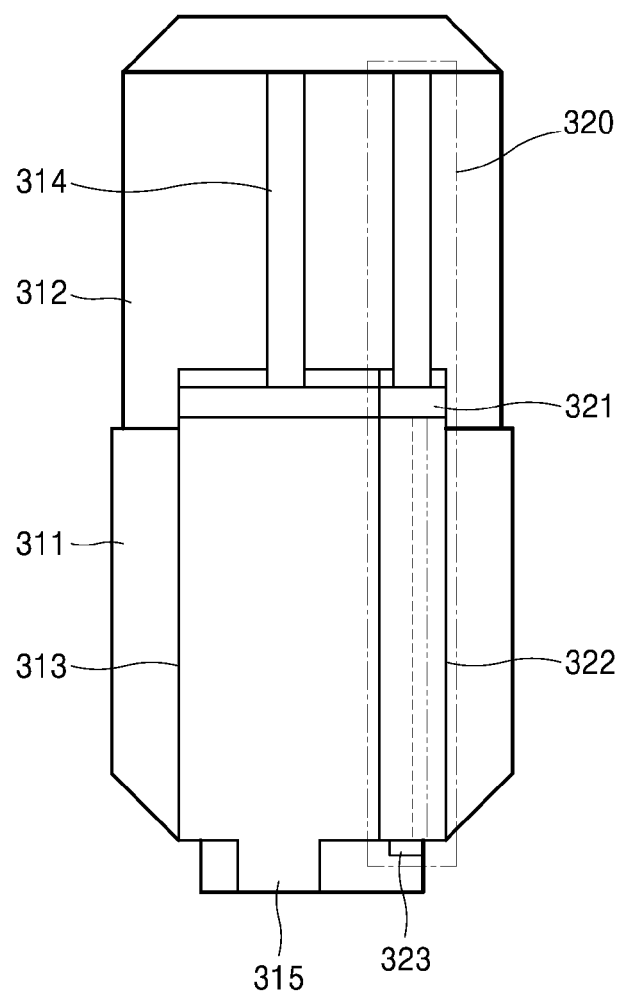
[Fig. 3]

[Fig. 4]
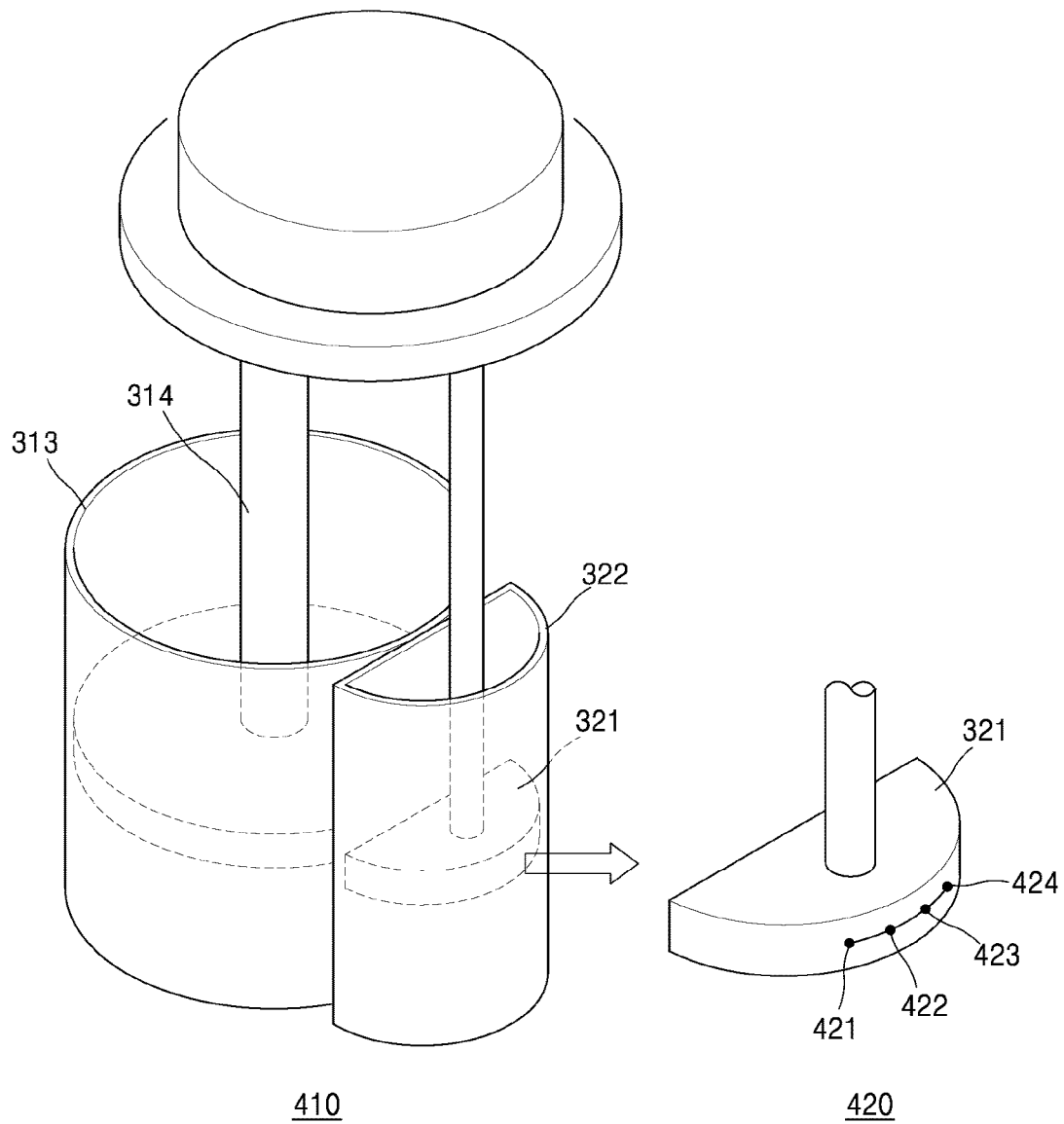

[Fig. 5A]
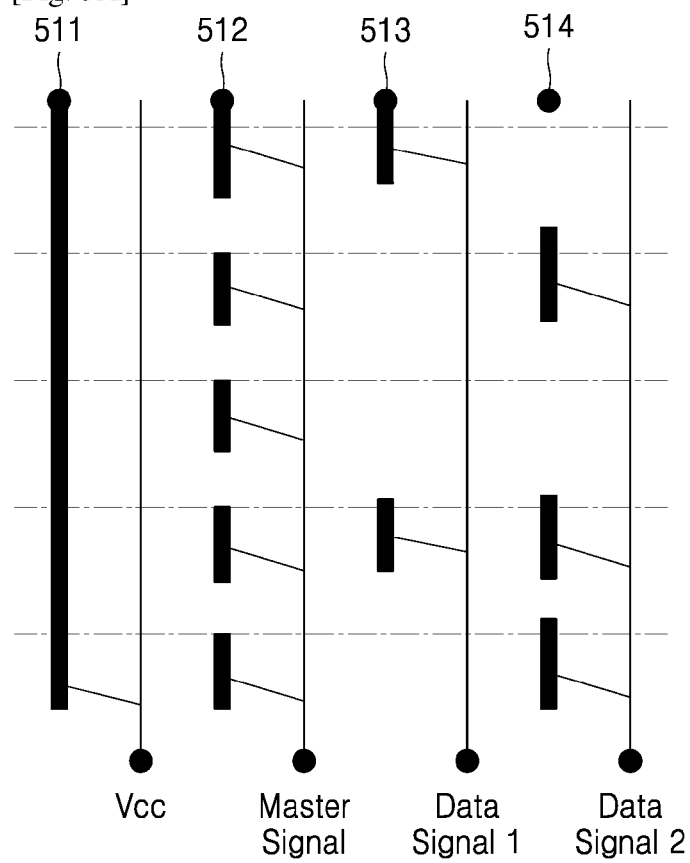
510
[Fig. 5B]
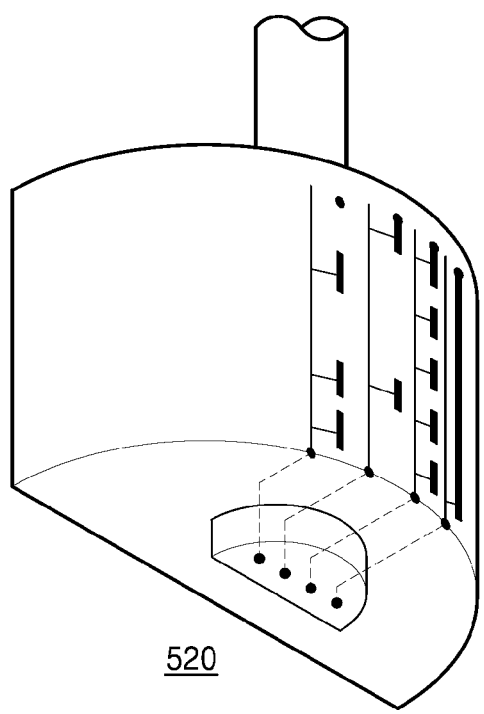
520

[Fig. 6]
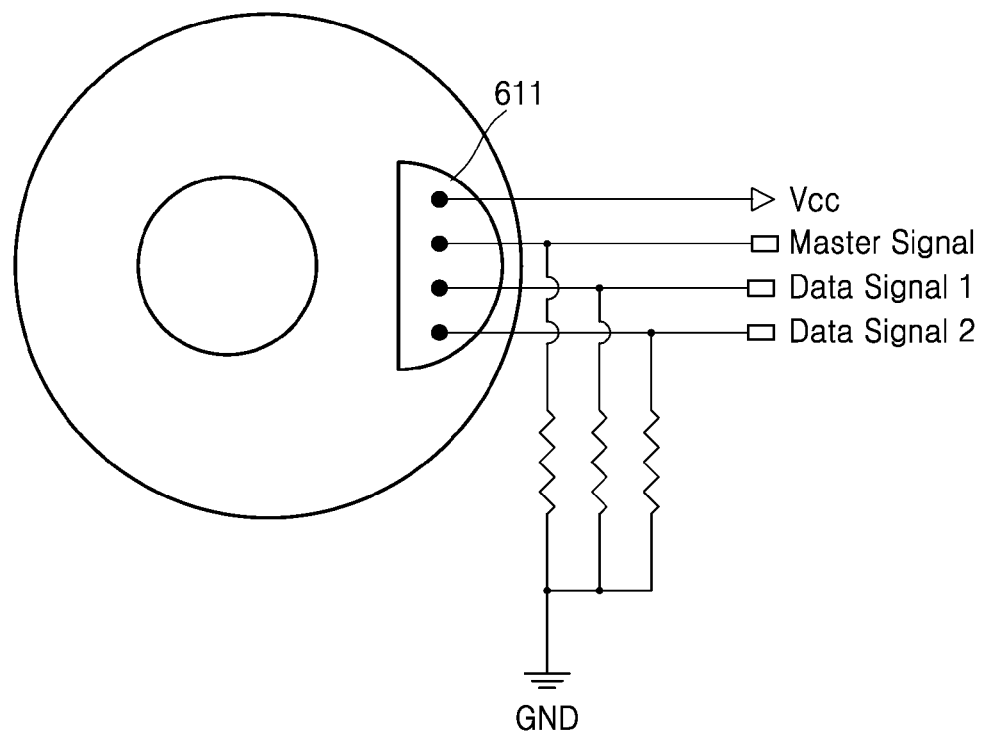
[Fig. 7]
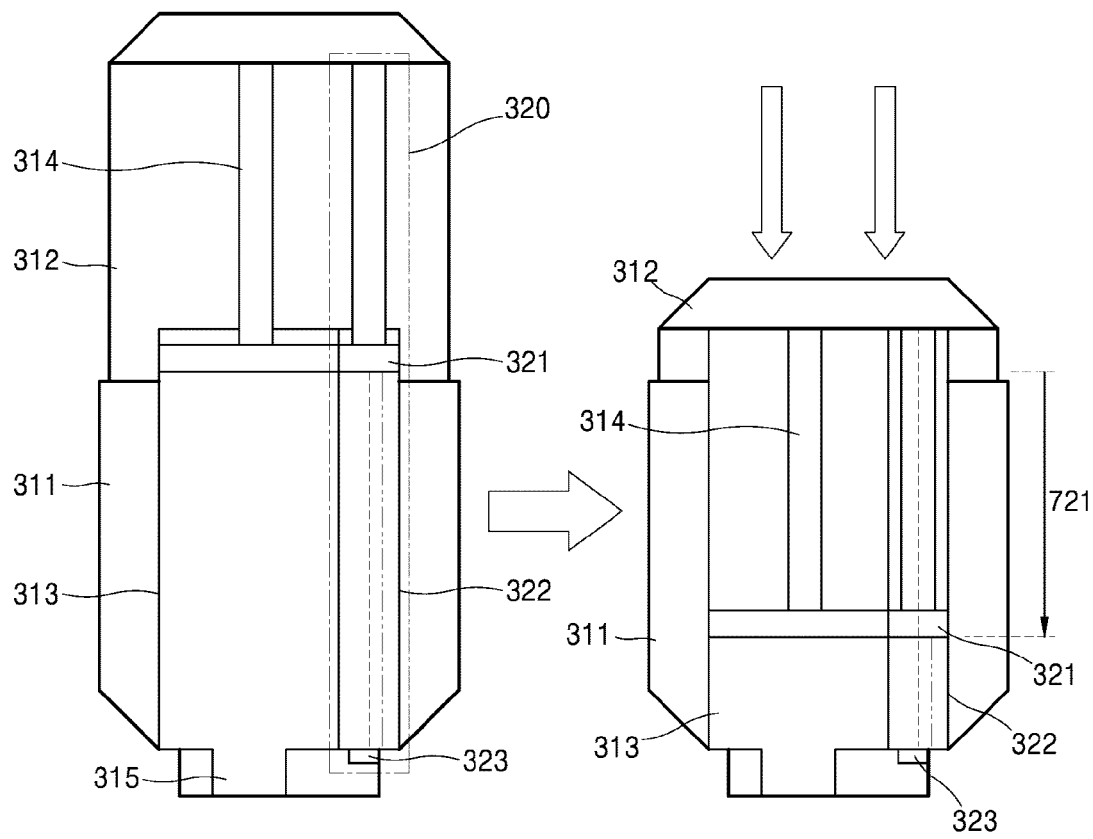

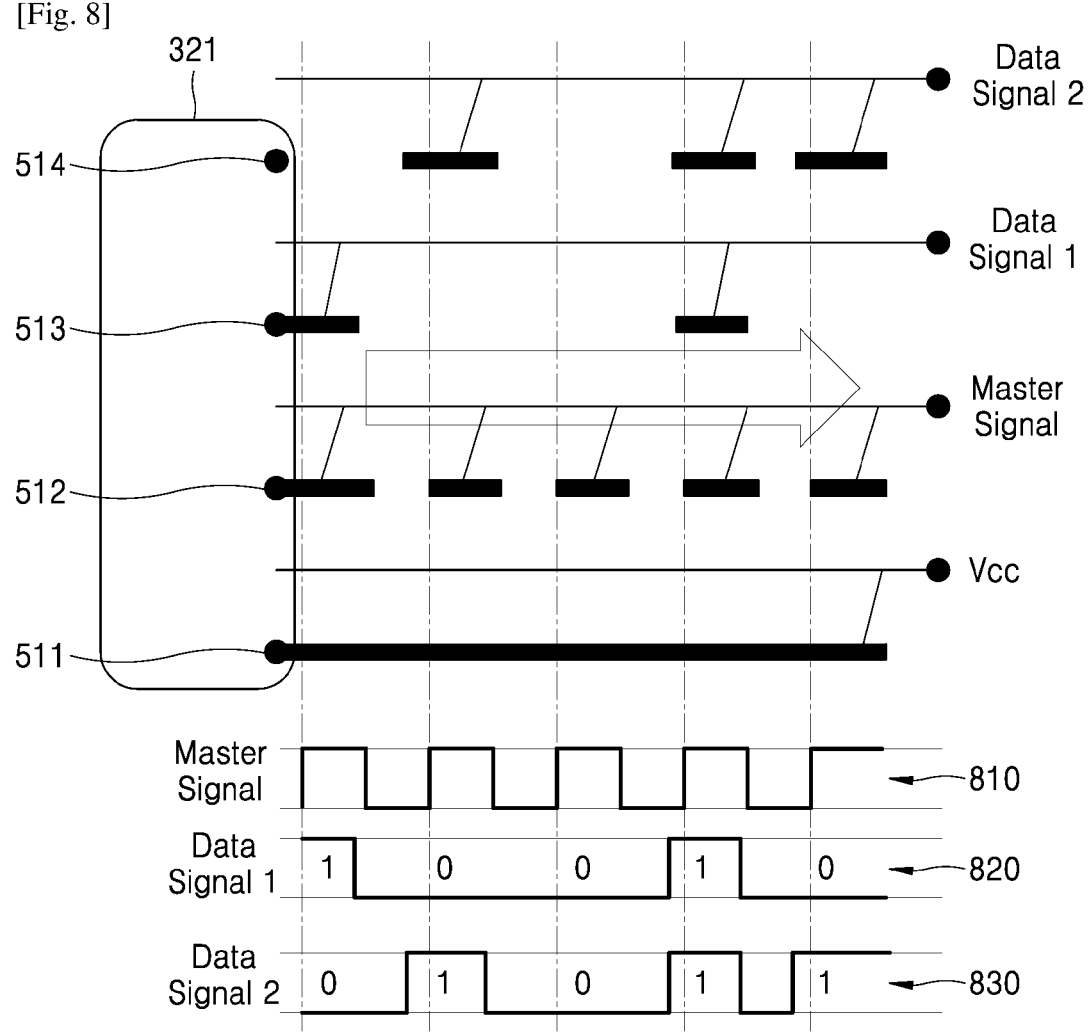
[Fig. 8]

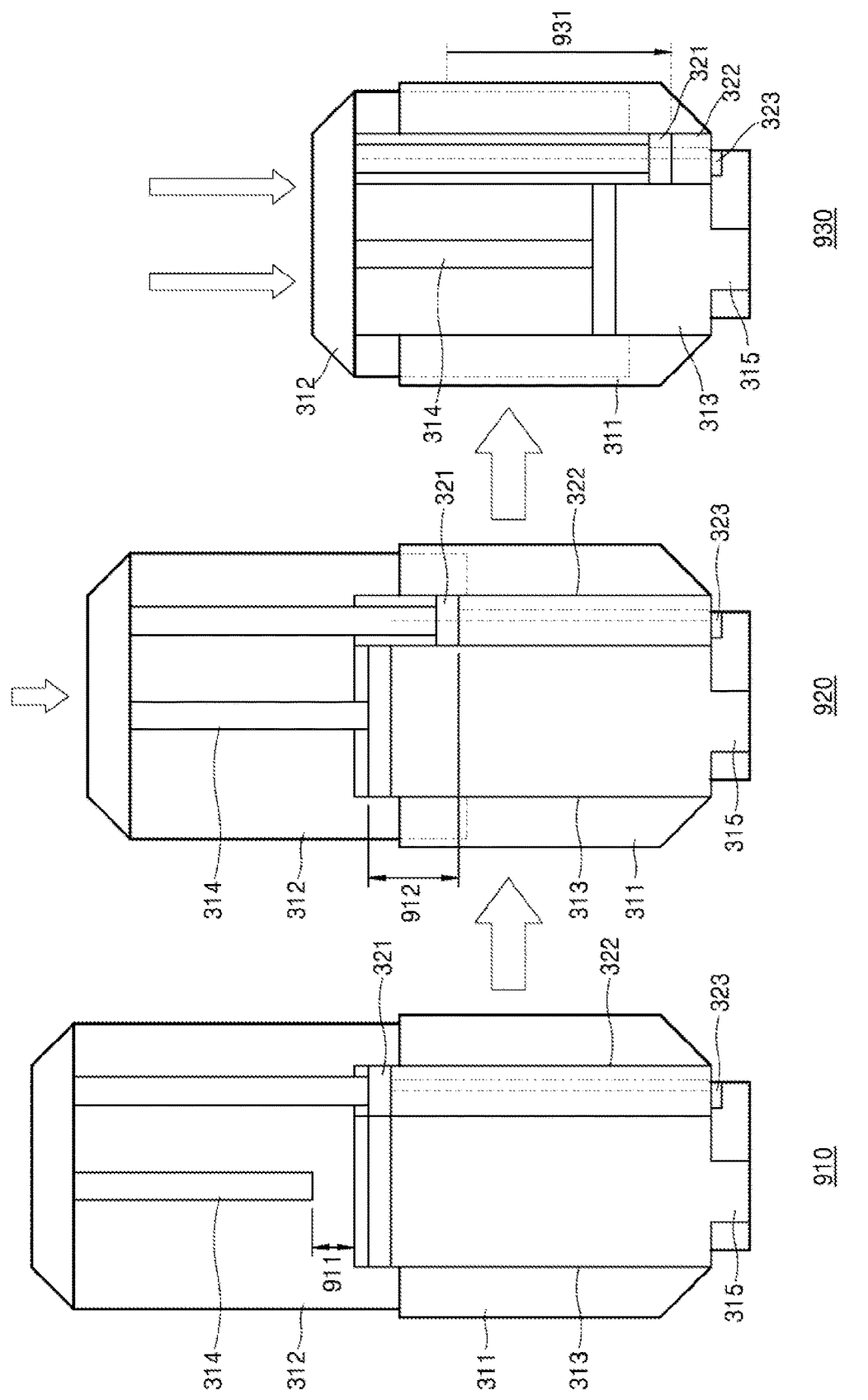
[Fig. 9]

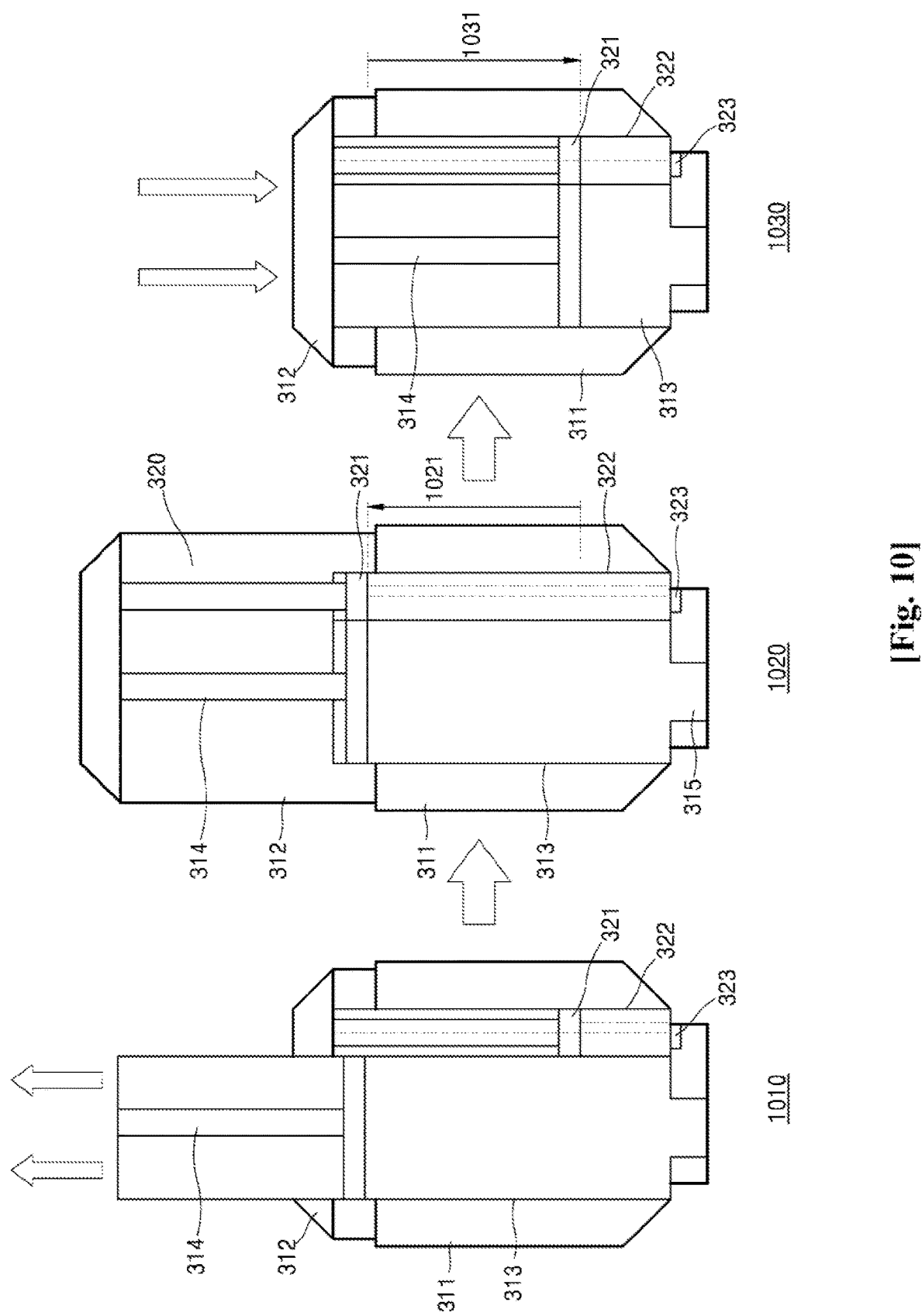
[Fig. 10]

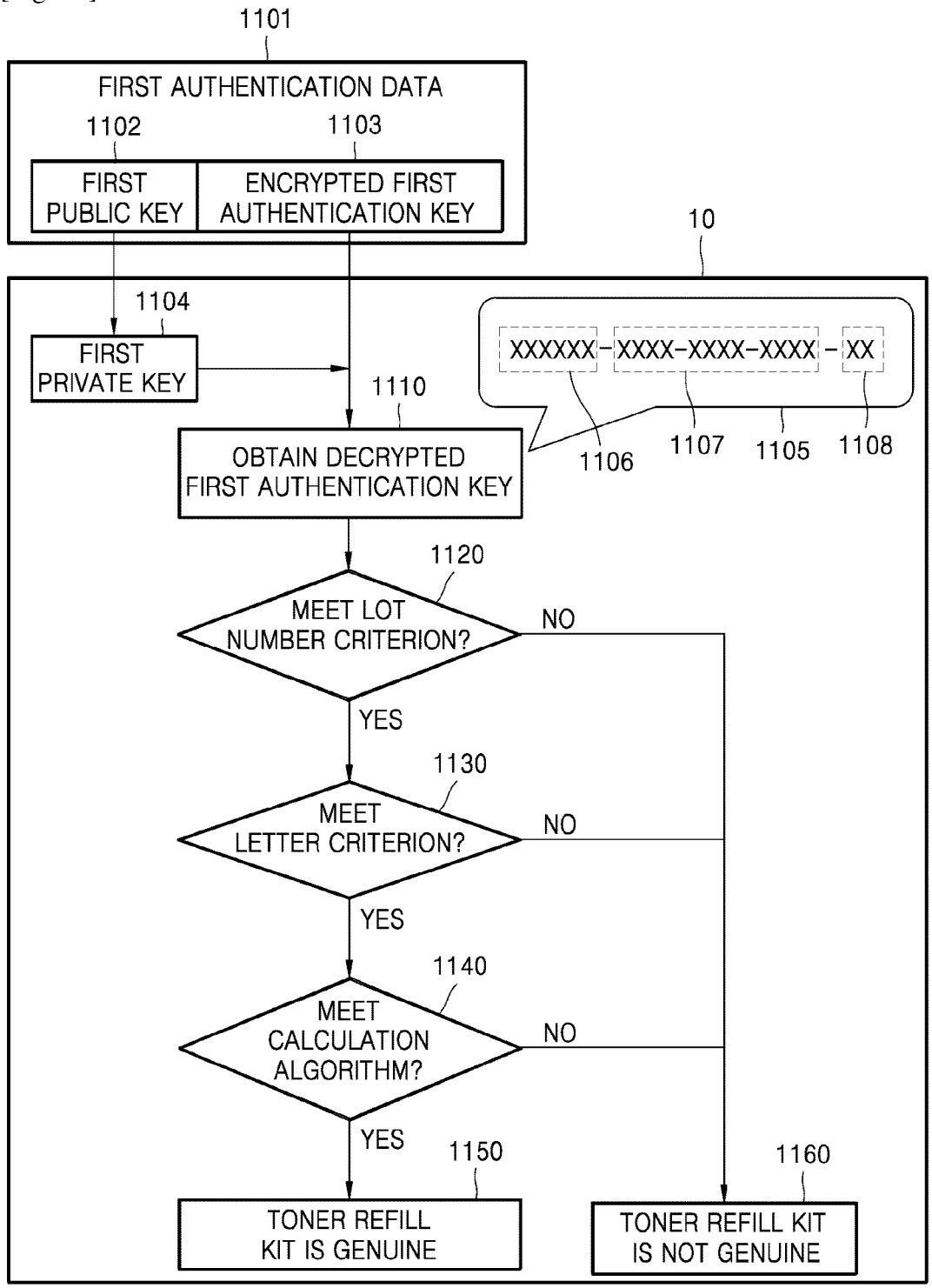
[Fig. 11]

[Fig. 12]
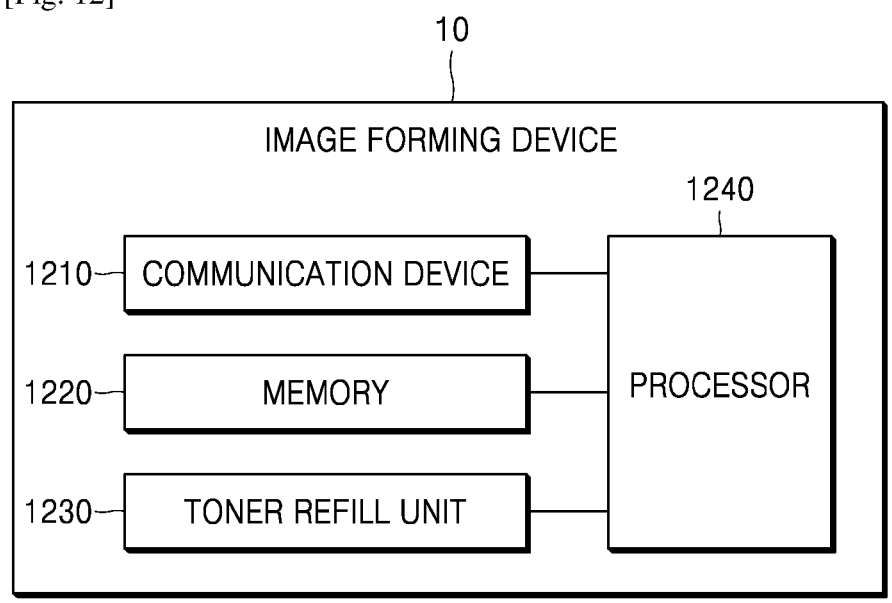

TONER REFILL KITS GENUINENESS AUTHENTICATION USING ELECTRICAL SIGNALS

BACKGROUND ART

An image forming device uses ink or toner to print an image on paper. Since the ink or toner is used every time an image forming operation proceeds, it is exhausted when it is used for a predetermined length of time or longer.

In this case, a component storing the ink or toner needs to be replaced. The component may also be refilled with ink or toner. For example, since a cartridge containing toner is a consumable but is relatively expensive, the toner may be refilled into the cartridge for repeated use.

BRIEF DESCRIPTION OF DRAWINGS

The above and other aspects, features, and advantages of certain examples of the present disclosure will be more apparent from the following description taken in conjunction with the accompanying drawings, in which:

FIG. 1 is a conceptual diagram for explaining a toner refilling operation through genuineness authentication of a toner refill kit in an image forming device, as the toner refill kit is coupled to the image forming device, according to an example;

FIG. 2 is a flowchart of a method of operating an image forming device according to an example;

FIG. 3 is a cross-sectional view of a configuration of a toner refill kit, such as the toner refill kit of FIG. 1, according to an example;

FIG. 4 is a view for explaining a configuration of a signal generator for generating an electrical signal in a toner refill kit, according to an example;

FIGS. 5A and 5B are views for explaining a pattern coated with a conductive material corresponding to an authentication key of a toner refill kit and a signal connector for transmitting an electrical signal generated by the pattern to an image forming device, according to an example;

FIG. 6 is a view for explaining a signal detector for detecting an electrical signal generated in a toner refill kit, according to an example;

FIG. 7 is a view for explaining a process of generating an electrical signal in a toner refill kit, according to an example;

FIG. 8 is a view for explaining a process of converting an electrical signal generated in a toner refill kit into a binary code, according to an example;

FIG. 9 is a view for explaining a process of performing genuineness authentication of a toner refill kit before toner is injected into an image forming device, according to an example;

FIG. 10 is a view for explaining a process of performing genuineness authentication of a toner refill kit before toner is injected into an image forming device, according to another example;

FIG. 11 is a view for explaining a process of authenticating whether a toner refill kit is genuine by using an electrical signal generated in the toner refill kit, according to an example; and FIG. 12 is a block diagram of a configuration of an image forming device according to an example.

Throughout the drawings, it should be noted that like reference numbers are used to depict the same or similar elements, features, parts, components, and structures.

MODE FOR THE INVENTION

Various examples now will be described more fully hereinafter with reference to the accompanying drawings.

The examples described hereinafter may be modified in many different forms. To more clearly describe features of examples, matters well known to one of ordinary skill in the art to which the below examples pertain will not be described in detail.

An "image forming device" may be any device capable of performing an image forming job, such as a printer, a copier, a scanner, a fax machine, a multi-function printer (MFP), or a display device. Also, "print data" may be data converted into a printable format in a printer. A "scan file" may be a file generated by scanning an image with a scanner.

Throughout the description, when an element is referred to as being "connected" or "coupled" to another element, it can be directly connected or coupled to the other element, or can be connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

FIG. 1 is a conceptual diagram for explaining a toner refilling operation through genuineness authentication of a toner refill kit in an image forming device, as the toner refill kit is coupled to the image forming device, according to an example.

Referring to FIG. 1, an image forming device 10 may include a main body 1 and a cartridge removable from the main body 1. The main body 1 may be provided with a door 3. The door 3 may open and close a portion of the main body 1.

In the example of FIG. 1, the door 3 is illustrated for opening an upper portion of the main body 1. However, this is merely an example and a door for opening a side or the whole of the main body 1 may be employed if necessary. The cartridge may be mounted in the main body 1 or removed from the main body 1.

The main body 1 may be provided with a communicating portion 8 such that a toner refill kit 20 may be coupled to the main body 1 in a state where the cartridge is mounted in the main body 1 and toner is to be injected. For example, when the toner refill kit 20 is inserted into the communicating portion 8, the image forming device 10 may detect coupling of the toner refill kit 20 to the image forming device 10. The communicating portion 8 may be provided on an upper surface 11 of the main body 1. The toner refill kit 20 may be coupled in a direction perpendicular to the upper surface 11 through the communicating portion 8. Furthermore, the communicating portion 8 may be provided at a position close to a front portion 12 of the main body 1. However, these are merely examples and the communicating portion 8 may be located at other positions of the main body 1.

In an example process illustrated in FIG. 1, the image forming device 10 may obtain an electrical signal generated from the toner refill kit 20 in operation 101. Referring to an image 110 and an image 120 of FIG. 1, the electrical signal may be generated in a process of inserting a plunger 312 of the toner refill kit 20 into a body 311 by a predetermined distance 121. In more detail, the electrical signal may be generated while the plunger 312 of the toner refill kit 20 is inserted into the body 311 and a header 321 of a signal generator 320 moving in synchronization with the plunger 312 moves on a wall surface of a support 322. A pattern for generating an electrical signal corresponding to an authentication key of the toner refill kit 20 may be applied to the wall surface of the support 322 with an electroconductive material. A signal connector 323 of the signal generator 320 may transmit an electrical signal to the image forming device 10.

The image forming device 10 may obtain authentication data corresponding to the electrical signal and obtain an authentication key used to authenticate the toner refill kit 20 from the authentication data in operation 102.

The image forming device 10 may authenticate the toner refill kit 20 by determining whether the authentication key satisfies a predetermined criterion in operation 103. When the authentication of the toner refill kit 20 is completed, the image forming device 10 may control operations of the toner refill kit 20 such that the cartridge is refilled with toner in operation 104.

FIG. 2 is a flowchart of a method of operating an image forming device according to an example.

Referring to FIG. 2, the image forming device 10 may detect coupling of the toner refill kit 20 to the image forming device 10 in operation 210.

In operation 220, the image forming device 10, based on a first electrical signal generated in the toner refill kit 20, may obtain first authentication data corresponding to the first electrical signal.

For example, the image forming device 10 may obtain a first electrical signal generated based on at least one pattern coated with an electroconductive material in the toner refill kit 20 from the toner refill kit 20. The at least one pattern may be a predetermined pattern for generating the first electrical signal corresponding to a first authentication key of the toner refill kit 20.

The image forming device 10 may obtain first authentication data in which data corresponding to at least one pattern is converted into a binary code based on the first electrical signal.

In operation 230, the image forming device 10 may obtain the first authentication key used to authenticate the toner refill kit 20 from the first authentication data.

For example, the first authentication data may be data encrypted with a first public key. The image forming device 10 may detect a first private key corresponding to the first public key from a memory of the image forming device 10. The image forming device 10 may decrypt the first authentication data by using the first private key to obtain the first authentication key. For example, the first authentication key may be a combination of numbers (e.g., a 20-digit number), a combination of letters, a combination of numbers and letters, etc.

In operation 240, the image forming device 10 may apply the first authentication key to a predetermined criterion used to determine validity of the toner refill kit 20 to determine whether the toner refill kit 20 is genuine.

The image forming device 10 may determine whether authentication information obtained from the at least one number or letter constituting the first authentication key meets the predetermined criterion. When the authentication information meets the predetermined criterion, the image forming device 10 may determine whether the toner refill kit 20 is genuine. When the authentication information does not meet the predetermined criterion, the image forming device 10 may determine that the toner refill kit 20 is not genuine.

For example, the predetermined criterion may be a first criterion for verifying an authentication key corresponding to the toner refill kit 20 based on production schedule information of the toner refill kit 20. As another example, the predetermined criterion may be a second criterion for calculating values converted from numbers or letters constituting the authentication key corresponding to the toner refill kit 20 according to a predetermined calculation algorithm and verifying the authentication key corresponding to the toner refill kit 20. As another example, the predetermined criterion may be a third criterion for verifying the authentication key corresponding to the toner refill kit 20 by using a position at which numbers or letters constituting the authentication key corresponding to the toner refill kit 20 are arranged. Furthermore, the predetermined criterion may be a criterion meeting at least two of the first criterion, the second criterion, and the third criterion described above.

In operation 250, the image forming device 10 may control a toner refilling operation of the toner refill kit 20 based on whether the toner refill kit 20 is genuine.

For example, when the toner refill kit 20 is genuine, the image forming device 10 may proceed with the toner refilling operation of the toner refill kit 20. The image forming device 10 may obtain first injection data indicating a capacity of toner injected by the toner refilling operation, based on a second electrical signal generated after the first electrical signal is generated in the toner refill kit 20. The first injection data may be data indicating the amount of toner injected into the cartridge when the toner refilling operation is started. For example, a pattern corresponding to the second electrical signal may be a pattern for informing each time the amount of toner discharged from the toner refill kit 20 exceeds a predetermined amount after the toner refill kit 20 starts the toner refilling operation. The image forming device 10 may control the toner refilling operation of the toner refill kit 20 in accordance with the first injection data.

For example, when the toner refill kit 20 is not genuine, the image forming device 10 may stop the toner refilling operation of the toner refill kit 20.

FIG. 3 is a cross-sectional view of a configuration of a toner refill kit, such as the toner refill kit of FIG. 1, according to an example.

Referring to FIG. 3, the toner refill kit 20 may include the body 311, the plunger 312, a discharge shutter 315, and the signal generator 320. However, not all elements shown in the drawings are necessary elements. The toner refill kit 20 may be embodied with more or fewer elements than the elements shown in the drawings. Hereinafter, examples of the elements will be described.

The body 311 may have an inner space 313, in which toner is accommodated, and a toner outlet through which the toner is discharged. The plunger 312 may be inserted into the inner space 313 so as to be movable in a longitudinal direction of the body 311. The plunger 312 may have a syringe-shaped or cylinder-shaped injection port 314 so that the toner accommodated in the inner space 313 is discharged through the toner outlet. The discharge shutter 315 may open and close the toner outlet.

For example, the body 311 may be cylindrical. The toner outlet, through which toner is discharged, and the discharge shutter 315 for opening and closing the toner outlet may be provided at an end of the body 311. The plunger 312 may be inserted into the inner space 313 from an opposite end of the toner outlet of the body 311. When the toner refill kit 20 is authenticated as being genuine, the discharge shutter 315 may open the toner outlet. When the genuineness authentication of the toner refill kit 20 is completed, the discharge shutter 315 may automatically open the toner outlet. Furthermore, the discharge shutter 315 may be provided with an operation lever capable of manually operating the toner outlet.

The signal generator 320 may move in synchronization with movement of the plunger 312. The signal generator 320 may generate an electrical signal used to determine whether the toner refill kit 20 is genuine as the plunger 312 moves.

The signal generator 320 may include the support 322, the header 321, and the signal connector 323. The signal generator 320 may be embodied with more or fewer elements than the elements shown in FIG. 3.

The support 322 may have a surface in which at least one pattern corresponding to an authentication key of the toner refill kit 20 is applied in the longitudinal direction of the body 311 with an electroconductive material.

The header 321 may move along the surface of the support 322 in synchronization with the movement of the plunger 312, and may generate an electrical signal by recognizing at least one pattern. The header 321 may be physically connected to the plunger 312. When the plunger 312 moves by a predetermined distance in a longitudinal direction of the body 311, the header 321 moves by a predetermined distance in a longitudinal direction of the support 322. The longitudinal direction of the body 311 and the longitudinal direction of the support 322 are parallel.

The header 321 may include contacts corresponding to at least one pattern for recognizing the at least one pattern. In addition, each of the contacts may be formed of a conductor in the header 321 and electrically connected to each other. Meanwhile, portions other than the contacts in the header 321 may be formed of a nonconductor. Thus, each of the contacts of the header 321 may recognize a pattern coated with an electroconductive material on a wall surface of the support 322, without electrically interfering with any of the other contacts in the header 321.

The signal connector 323 may transmit an electrical signal to the image forming device. When the signal connector 323 receives a signal indicating that the genuineness authentication of the toner refill kit 20 is completed, the toner outlet may be opened and toner may be injected into the image forming device as the plunger 312 moves in the longitudinal direction of the body 311.

In other examples, the toner refill kit 20 may be designed differently from the structure shown in FIG. 3. For example, the plunger 312 may be designed to have a predetermined empty space from an upper end of the body 311. The header 321 may move along the surface of the support 322 in synchronization with the movement of the plunger 312 before the plunger 312 passes through the empty space. When moving along the surface, the header 321 may recognize the at least one pattern that is applied to the surface with an electroconductive material to generate an electrical signal. The signal connector 323 may transmit the generated electrical signal to the image forming device. The image forming device may perform genuineness authentication of the toner refill kit 20 using the electrical signal. The signal connector 323 may receive a signal indicating that the genuineness authentication of the toner refill kit 20 is completed. When the plunger 312 passes through the empty space while moving in the longitudinal direction of the body 311, toner may be injected into the image forming device while the toner outlet is opened.

In addition, as the plunger 312 moves in a direction opposite to the longitudinal direction of the body 311, the header 321 may move along the surface of the support 322 in synchronization with the movement of the plunger 312. The header 321 may recognize the at least one pattern that is applied to the surface with an electroconductive material to generate an electrical signal. In addition, as the plunger 312 moves in the longitudinal direction of the body 311 after moving in the direction opposite to the longitudinal direction of the body 311, the header 321 may move along the surface of the support 322 in synchronization with the movement of the plunger 312. The header 321 may recognize the at least one pattern that is applied to the surface with an electroconductive material to generate an electrical signal. The signal connector 323 may transmit an electrical signal generated as the header 321 moves in the direction opposite to the longitudinal direction of the body 311 and an electrical signal generated as the header 321 moves in the longitudinal direction of the body 311 to the image forming device. The image forming device may authenticate whether the toner refill kit 20 is genuine by using the received electrical signals. When the signal connector 323 receives a signal indicating that the genuineness authentication of the toner refill kit 20 is completed, the toner outlet may be opened and toner may be injected into the image forming device as the plunger 312 moves in the longitudinal direction of the body 311.

Security of the authentication key of the toner refill kit 20 may be enhanced by applying a pattern for generating an electrical signal corresponding to the authentication key of the toner refill kit 20 to the toner refill kit 20 with an electroconductive material. Further, since no separate hardware configuration related to genuineness authentication is required in the toner refill kit 20, production costs of the toner refill kit 20 may be reduced.

FIG. 4 is a view for explaining a configuration of a signal generator for generating an electrical signal in a toner refill kit, according to an example.

Referring to FIG. 4, the plunger 312 is inserted into a body of the toner refill kit 20 so that the injection port 314 in the plunger 312 may be inserted into an inner space 313 of the body, as illustrated in an image 410. In addition, as the plunger 312 moves in a longitudinal direction of the body, the header 321 of the signal generator may move in a longitudinal direction of the support 322 in synchronization with the movement of the plunger 312. The header 321 may move in the longitudinal direction of the support 322 by contacting a surface of the support 322. When moving in the longitudinal direction of the support 322, the header 321 may recognize at least one pattern that is applied to the surface of the support 322 with an electroconductive material. The at least one pattern may be a pattern drawn with an electroconductive material to generate an electrical signal corresponding to an authentication key of the toner refill kit 20.

As illustrated in an image 420, the header 321 may include contacts respectively corresponding to at least one pattern applied to the surface of the support 322. Each contact may be formed of a conductor. The contacts may be provided on a surface of the header 321 that is in contact with the surface of the support 322 as the header 321 moves in the longitudinal direction of the support 322. As shown in the image 420, the header 321 may be configured in a semicircular or polygonal shape. The header 321 may be implemented in the form of a cylinder.

For example, the header 321 may have four contacts 421, 422, 423, and 424. Each of the four contacts 421, 422, 423, and 424 may be used to recognize a corresponding one of four patterns applied to the surface of the support 322.

The patterns above the surface of the support base 322 are coated with an electroconductive material. Therefore, as the header 321 moves in the longitudinal direction of the support table 322, each of the contacts 421, 422, 423, and 424 of the header 321 may recognize a pattern corresponding to the contact, and the header 321 may generate an electrical signal corresponding to each pattern.

FIGS. 5A and 5B are views for explaining a pattern coated with a conductive material corresponding to an authentication key of the toner refill kit and a signal connector for transmitting an electrical signal generated by the pattern to an image forming device, according to an example.

Referring to FIG. 5A, at least one pattern for generating an electrical signal corresponding to the authentication key of the toner refill kit 20 may be applied to a surface of a support in the toner refill kit 20 with an electroconductive material, as illustrated in an image 510.

As shown in FIG. 5A, the pattern may include lines (e.g., thick lines) and may be applied to a wall surface with an electroconductive material. The pattern applied in the toner refill kit 20 may be different from a pattern applied in another toner refill kit because the pattern applied in the toner refill kit 20 is used to generate the electrical signal corresponding to the authentication key of the toner refill kit 20. In addition, the wall surface may be configured such that no electrical interference occurs between an area coated with an electroconductive material and an area not coated with an electroconductive material.

The pattern may include patterns 513 and 514 for generating the electrical signal corresponding to the authentication key, a pattern 512 used for converting the electrical signal generated by the patterns 513 and 514 into a binary code, and a pattern 511 for supplying power.

The header 321 may generate the electrical signal when moving along the surface of the support. For example, when moving in a longitudinal direction of the support, the header 321 may obtain a master signal corresponding to the pattern 512, a first data signal corresponding to the pattern 513, and a second data signal corresponding to the pattern 514.

In various examples, the number of patterns may be changed according to the amount of data of the electrical signal corresponding to the authentication key of the toner refill kit 20.

Referring to FIG. 5B, each of the patterns 511, 512, 513, and 514 may be connected to the signal connector 323, as illustrated in an image 520. In the signal connector 323, the header 321 may move along a surface of the support 322 to transmit an electrical signal generated from each of the patterns 511, 512, 513, and 514 to the image forming device 10 connected to the toner refill kit 20. For example, the signal connector 323 may transmit the electrical signal generated from each of the patterns 511, 512, 513, and 514 to a signal detector of the image forming device 10.

FIG. 6 is a view for explaining a signal detector for detecting an electrical signal generated in a toner refill kit, according to an example.

The toner refill kit 20 may be mounted in the image forming device 10 to refill a cartridge in the image forming device 10 with toner. In this case, the image forming device 10 may include a toner refill unit for accommodating the toner refill kit 20. The toner refill unit may include a communicating portion for mounting the toner refill kit 20 on the image forming device 10.

Referring to FIG. 6, a cross section of a signal detector 611 in contact with the toner refill kit 20 when the toner refill kit 20 is mounted in the image forming device 10 is illustrated.

The signal detector 611 may include terminals corresponding to contacts in a header of the toner refill kit 20. For example, the signal detector 611 may include a power supply terminal for supplying power, a master terminal for detecting a master signal of the toner refill kit 20, a first terminal for detecting a first data signal of the toner refill kit 20, and a second terminal for detecting a second data signal of the toner refill kit 20.

For example, the master terminal, the first terminal, and the second terminal may be basically in a state where a potential is pulled down. When a power terminal and the first terminal are connected to each other, a high signal may be detected, and when the power terminal and the first terminal are not connected to each other, a low signal may be detected.

Since the signal detector 611 is connected to the signal generator 320 in the toner refill kit 20 in a connector form, each terminal in the signal detector 611 may receive a signal of each contact in the signal generator 320.

FIG. 7 is a view for explaining a process of generating an electrical signal in a toner refill kit, according to an example.

Referring to FIG. 7, an internal structure in a state in which the toner refill kit 20 does not start a toner refilling operation is illustrated in an image 710. In more detail, the body 311 of the toner refill kit 20 may include the inner space 313 in which toner is accommodated and a toner outlet through which the toner is discharged. The body 311 may also include a discharge shutter 315 for opening and closing the toner outlet.

The plunger 312 of the toner refill kit 20 may be inserted into the inner space 313 so as to be movable in a longitudinal direction of the body 311. The plunger 312 may include the injection port 314 which may adjust an injection speed of toner such that the toner may be injected.

The header 321 in the signal generator 320 may contact a surface of the support 322 as the header 321 moves. At least one pattern corresponding to an authentication key of the toner refill kit 20 may be applied to the surface of the support 322 in the longitudinal direction of the body 311 with an electroconductive material. The at least one pattern may be a pattern drawn with an electroconductive material to generate an electrical signal corresponding to the authentication key of the toner refill kit 20. When moving along the surface in the longitudinal direction of the support 322, the header 321 may read the pattern coated with the electroconductive material and generate an electrical signal.

In more detail, the header 321 in the signal generator 320 may move in synchronization with the movement of the plunger 312, as illustrated in an image 720. For example, when the plunger 312 moves by a first distance 721 in the longitudinal direction of the body 311, the header 321 also moves by the first distance 721 in the longitudinal direction of the support 322. The header 321 may generate an electrical signal corresponding to a pattern read while moving by the first distance 721. For example, the header 321 may detect a signal corresponding to an area coated with an electroconductive material on a wall surface as a high signal, and may detect a signal corresponding to an area not coated with an electroconductive material as a low signal. The header 321 may generate an electrical signal by connecting the detected high and low signals to each other.

The header 321 may transmit the generated electrical signal to the signal connector 323. Further, the signal connector 323 may be connected to a signal detector in the image forming device 10 to transmit the electrical signal.

FIG. 8 is a view for explaining a process of converting an electrical signal generated in a toner refill kit into a binary code, according to an example.

Referring to FIG. 8, the header 321 may move along the surface of the support 322 in synchronization with the movement of the plunger 312. The pattern applied to the surface with the electroconductive material may include the patterns 513 and 514 for generating the electrical signal corresponding to the authentication key, the pattern 512 used for converting the electrical signal generated by the patterns 513 and 514 into a binary code, and the pattern 511 for supplying power.

The pattern 512 may be coated with electroconductive materials at regular intervals.

Contacts in the header 321 may read the pattern 512 in which the electroconductive materials are applied at regular intervals while moving along the surface of the support 322. An area to which the electroconductive material is applied is turned on and an area to which the electroconductive material is not applied is turned off so that an electrical signal corresponding to the pattern 512 is generated.

A master signal, which is an electrical signal corresponding to the pattern 512, may be shown as a graph 810. Referring to the graph 810, a starting point of the area to which the electroconductive material is applied is shown as a rising edge, and a starting point of the area to which the electroconductive material is not applied is shown as a falling edge.

The pattern 513 and the pattern 514 may be those in which electroconductive materials are applied in an arrangement for generating an electrical signal corresponding to the authentication key of the toner refill kit 20. The contacts in the header 321 may read each of the pattern 513 and the pattern 514 while moving along the surface of the support 322 in synchronization with the movement of the plunger 312. An area to which the electroconductive material is applied is turned on and an area to which the electroconductive material is not applied is turned off so that an electrical signal corresponding to each of the pattern 513 and the pattern 514 is generated.

The pattern 513 and the pattern 514 have respective areas to which different electroconductive materials are applied so that electrical signals generated by the pattern 513 and the pattern 514 are different from each other. A first data signal corresponding to the pattern 513 may be shown as a graph 820. In addition, a second data signal corresponding to the pattern 514 may be shown as a graph 830. Referring to the graph 820 and the graph 830, a starting point of the area to which the electroconductive material is applied is shown as a rising edge, and a starting point of the area to which the electroconductive material is not applied is shown as a falling edge.

The first data signal and the second data signal may be converted into binary codes based on the master signal. For example, when a data signal at the beginning of a rising edge of the master signal is a high signal, the data signal is converted to 1, and when the data signal is a low signal, the data signal may be converted to zero.

Referring to the graph 820, the first data signal may be converted to "10010". Also, referring to a graph 830, the second data signal may be converted to "01011".

A signal generator may be designed such that the first data signal and the second data signal are output a predetermined time ahead of the master signal so that the electrical signal is accurately converted to the binary code.

FIG. 9 is a view for explaining a process of performing genuineness authentication of a toner refill kit before toner is injected into an image forming device, according to an example.

Referring to FIG. 9, in the toner refill kit 20, the plunger 312 may be designed to have a predetermined empty space 911 from an upper end of the body 311, as illustrated in an image 910. For example, the empty space 911 may be provided between the injection port 314 in the plunger 312 and the upper end of the body 311.

As the plunger 312 moves by a distance corresponding to the empty space 911 in a longitudinal direction of the body 311, the header 321 also moves along a surface of the support table 322 by a distance 912 corresponding to the empty space 911 as illustrated in an image 920. Since the injection port 314 in the plunger 312 moves by the distance corresponding to the empty space 911, toner contained in the inner space 313 of the body 311 is not injected into the image forming device.

As the header 321 moves, the header 321 may recognize at least one pattern that is applied to the surface of the support 322 with an electroconductive material to generate an electrical signal. The signal connector 323 may transmit the electrical signal to a signal detector of the image forming device. The electrical signal generated due to the movement of the header 321 may be used for genuineness authentication of the toner refill kit 20. The image forming device may obtain an authentication key using authentication data converted based on the electrical signal. The image forming device may determine whether the authentication key is valid and authenticate whether the toner refill kit 20 is genuine. When the toner refill kit 20 is genuine, the image forming device may control operations of the toner refill kit 20 such that toner is injected from the toner refill kit 20. For example, the image forming device may control a discharge shutter 315 such that a toner outlet from which toner of the toner refill kit 20 is discharged is opened.

When the toner outlet of the toner refill kit 20 is opened and the plunger 312 moves by a predetermined distance 931 in the longitudinal direction of the body 311, the injection port 314 in the plunger 312 may inject toner contained in the inner space 313 of the toner refill kit 20 into a cartridge of the image forming device while moving by the predetermined distance 931 in the longitudinal direction of the body 311 as illustrated in an image 930.

FIG. 10 is a view for explaining a process of performing genuineness authentication of a toner refill kit before toner is injected into an image forming device, according to another example.

Referring to FIG. 10, the plunger 312 of the toner refill kit 20 may be designed to be inserted into the body 311, as illustrated in an image 1010. In this case, the injection port 314 for allowing toner to be injected into the image forming device may protrude to the outside of the body 311.

When the plunger 312 moves in a direction opposite to a longitudinal direction of the body 311, the header 321 may move along the surface of the support 322 in synchronization with the movement of the plunger 312 as illustrated in an image 1020. The plunger 312 may be coupled to the injection port 314 when moving by a distance 1021 corresponding to the direction opposite to the longitudinal direction of the body 311, and the header 321 may move along the surface of the support 322 by the distance 1021.

As the header 321 moves, the header 321 may recognize the at least one pattern that is applied to the surface of the support 322 with an electroconductive material to generate an electrical signal. The signal connector 323 may transmit the electrical signal to the signal detector of the image forming device. The electrical signal generated due to the movement of the header 321 may be used for genuineness authentication of the toner refill kit 20. The image forming device may determine whether the toner refill kit 20 is genuine and may control a toner outlet of the toner refill kit 20 to be opened when the toner refill kit 20 is genuine.

When the toner outlet of the toner refill kit 20 is opened and the plunger 312 moves by a predetermined distance 1031 in the longitudinal direction of the body 311, the injection port 314 in the plunger 312 may inject toner contained in the inner space 313 of the toner refill kit 20 into a cartridge of the image forming device while moving by the predetermined distance 1031 in the longitudinal direction of the body 311, as illustrated in an image 1030.

When the amount of authentication data required to authenticate whether the toner refill kit 20 is genuine is large, the toner outlet is not opened/closed, and as the plunger 312 moves in the longitudinal direction of the body 311, the header 321 may also move along the surface of the support 322 in synchronization with the movement of the plunger 312. The electrical signal generated as the header 321 moves may be used for genuineness authentication of the toner refill kit 20. When the genuineness authentication of the toner refill kit 20 is completed, the toner outlet is opened, and toner may be injected into the cartridge of the image forming device as the plunger 312 moves.

FIG. 11 is a view for explaining a process of authenticating whether a toner refill kit is genuine by using an electrical signal generated in the toner refill kit, according to an example.

Referring to FIG. 11, the image forming device 10, based on the first electrical signal generated in the toner refill kit 20, may obtain first authentication data 1101 corresponding to the generated first electrical signal. The first authentication data 1101 may be data encrypted with a first public key 1102. Accordingly, the first authentication data 1101 may include the first public key 1102 and an encrypted first authentication key 1103. The image forming device 10 may detect a first private key 1104 corresponding to the first public key 1102 from data stored in a memory of the image forming device 10. The memory of the image forming device 10 may store a table of the public key-private key, and may detect the private key corresponding to the public key.

In operation 1110, the image forming device 10 may decrypt the first authentication data 1101 with the first private key 1104 to obtain a decrypted first authentication key 1105. For example, the first authentication key 1105 may be a combination of numbers (e.g., a 20-digit number), a combination of letters, or a combination of numbers and letters.

In operation 1120, the image forming device 10 may determine whether the first authentication key 1105 meets a first criterion indicating a lot number criterion. Here, the first criterion may be a criterion for verifying an authentication key corresponding to a toner refill kit by production schedule information of the toner refill kit.

For example, the first six digits of the authentication key of the toner refill kit may indicate production schedule information of the toner refill kit. For example, the first six digits may be a sequence of numbers or a combination of letters representing the year, month, and day. The production schedule information may be expressed in 25 digits based on numbers from 0 to 9 and alphabetic letters from A to O. The image forming device 10 may determine whether first six digits 1106 in the first authentication key 1105 meet the first criterion. When the first six digits 1106 are represented by numbers from 0 to 9 and letters other than the alphabetic letters A to O, the image forming device 10 may determine that the toner refill kit 20 is not genuine according to operation 1160. When the first authentication key 1105 meets the first criterion, the image forming device 10 may determine whether the first authentication key meets a second criterion.

In operation 1130, when the first authentication key 1105 meets the first criterion, the image forming device 10 may determine whether the first authentication key 1105 meets the second criterion indicating a predetermined letter criterion. Here, the second criterion may be a criterion for verifying the authentication key corresponding to the toner refill kit by using a position at which numbers or letters constituting the authentication key corresponding to the toner refill kit are arranged.

For example, the second criterion may include a condition that Latin alphabet capital letters are placed at specific positions and numbers are placed at the remaining positions in 12 digits excluding first 6 digits and 2 digits at the end in the authentication key of the toner refill kit. For example, the above condition may be that Latin alphabet capital letters are placed in 9th, 12th, 13th, and 16th digits of the authentication key, and numbers are placed in the remaining digits. The image forming device 10 may determine whether 12 digits 1107 in the first authentication key 1105 meets the second criterion. When the first authentication key 1105 does not meet the second criterion, the image forming device 10 may determine that the toner refill kit 20 is not genuine according to operation 1160. When the first authentication key 1105 meets the second criterion, the image forming device 10 may determine whether the first authentication key meets a third criterion.

In operation 1140, when the first authentication key 1105 meets the second criterion, the image forming device 10 may determine whether the first authentication key 1105 meets the third criterion indicating a criterion for a predetermined calculation algorithm. Here, the third criterion may be a criterion for calculating values converted from numbers or letters constituting the authentication key corresponding to the toner refill kit according to the predetermined calculation algorithm and verifying the authentication key corresponding to the toner refill kit.

For example, in the predetermined calculation algorithm, the first calculation may be a calculation of converting 18 digits excluding the 2 digits at the end into an ASCII value in the authentication key of the toner refill kit, and summing the converted values. The second calculation may be a calculation of dividing the sum value in the first calculation by an 18-digit value and dividing the divided value by 625, which is the maximum value of a two-digit binary number, to calculate the remainder. The third calculation may be a calculation of comparing the remainder calculated in the second calculation with the 2 digits at the end. When the first authentication key 1105 does not meet the third criterion, the image forming device 10 may determine that the toner refill kit 20 is not genuine according to operation 1160. When the first authentication key 1105 meets the third criterion, the image forming device 10 may determine that the toner refill kit 20 is genuine according to operation 1150.

FIG. 12 is a block diagram of a configuration of an image forming device according to an example.

Referring to FIG. 12, the image forming device 10 may include a communication device 1210, a memory 1220, a toner refill unit 1230, and a processor 1240. However, not all elements shown in the drawings are necessary elements. The image forming device 10 may be embodied with more or fewer elements than the elements shown in the drawings. Hereinafter, examples of the elements will be described.

The communication device 1210 may communicate with an external device. In more detail, the communication device 1210 may be connected to a network in a wired or wireless manner and may communicate with the external device. For example, the external device may be a server for managing the image forming device 10, a user's electronic device using the image forming device 10, a toner refill kit 20 combined with the image forming device 10, or the like. The communication device 1210 may include a communication module that supports one of a variety of wired or wireless communication methods. For example, the communication module may be in the form of a chipset or may be a sticker/barcode (e.g., a sticker including a near field communication (NFC) tag) or the like that includes information necessary for communication. The communication module may be a short-range communication module or a wired communication module.

The communication device 1210 may support at least one of, for example, a wireless LAN, wireless fidelity (Wi-Fi), Wi-Fi Direct, Bluetooth, a universal serial bus (universal serial bus), a Wired LAN, NFC, or the like.

The memory 1220 may store programs, data or files associated with the image forming device 10. For example, the processor 1240 may execute a program stored in the memory 1220, read data or a file stored in the memory 1220, or store a new file in the memory 1220. The memory 1220 may store program commands, data files, data structures or a combination thereof. The memory 1220 may store instructions executable by the processor 1240.

For example, the memory 1220 may determine whether the toner refill kit 20 is genuine when the toner refill kit 20 is coupled to the image forming device 10, and may store a program for controlling an operation of refilling a cartridge with toner when the toner refill kit 20 is determined to be genuine.

In more detail, the memory 1220 may include instructions for the toner refill kit 20 to detect access to the cartridge through the toner refill unit 1230, instructions for obtaining, based on a first electrical signal generated in the toner refill kit 20, first authentication data corresponding to the first electrical signal, instructions for obtaining a first authentication key used to authenticate the toner refill kit 20 from the first authentication data, instructions for confirming whether the toner refill kit 20 is genuine by applying the first authentication key to a predetermined criterion used for determining validity of an authentication key of a toner refill kit 20, instructions for controlling a toner refilling operation of the toner refill kit 20 based on whether the toner refill kit 20 is genuine, or the like.

The toner refill unit 1230 may operate to refill the cartridge with toner. For example, the toner refill unit 1230 may detect an attempt to make a physical connection between the image forming device 10 and the toner refill kit 20 in the form of an electrical signal, and may regulate a subsequent operation in which the toner refill kit 20 is refilled with toner or may transmit to the processor 1240 information that the physical connection attempt has been made.

The toner refill unit 1230 may detect coupling of the toner refill kit 20 to the image forming device 10. The toner refill unit 1230 may include a sensor (not shown), and the sensor may sense the coupling of the toner refill kit 20 to the image forming device 10 and may transmit a signal indicating that the coupling has been detected to the processor 1240.

The processor 1240 may obtain the first authentication data corresponding to the first electrical signal based on the first electrical signal generated in the toner refill kit 20.

For example, the processor 1240 may obtain a first electrical signal generated based on at least one pattern coated with an electroconductive material in the toner refill kit 20 from the toner refill kit 20. The at least one pattern may be a predetermined pattern for generating the first electrical signal corresponding to the first authentication key of the toner refill kit 20.

The processor 1240 may obtain first authentication data in which data corresponding to at least one pattern is converted into a binary code based on the first electrical signal.

The processor 1240 may obtain the first authentication key used to authenticate the toner refill kit 20 from the first authentication data.

For example, the first authentication data may be data encrypted with a first public key. The processor 1240 may detect a first private key corresponding to the first public key from the memory 1220 of the image forming device 10. The processor 1240 may decrypt the first authentication data by using the first private key to obtain the first authentication key. For example, the first authentication key may be a combination of numbers (e.g., a 20-digit number), a combination of letters, or a combination of numbers and letters.

The processor 1240 may apply the first authentication key to a predetermined criterion used to determine the validity of a toner refill kit to determine whether the toner refill kit 20 is genuine.

The processor 1240 may determine whether authentication information obtained from the at least one number or letter constituting the first authentication key meets the predetermined criterion. When the authentication information meets the predetermined criterion, the processor 1240 may determine whether the toner refill kit 20 is genuine. Meanwhile, when the authentication information does not meet the predetermined criterion, the processor 1240 may determine that the toner refill kit 20 is not genuine.

For example, the predetermined criterion may be a first criterion for verifying an authentication key corresponding to a toner refill kit 20 based on production schedule information of the toner refill kit 20. As another example, the predetermined criterion may be a second criterion for calculating values converted from numbers or letters constituting an authentication key corresponding to a toner refill kit 20 according to a predetermined calculation algorithm and verifying an authentication key corresponding to a toner refill kit 20. As another example, the predetermined criterion may be a third criterion for verifying an authentication key corresponding to a toner refill kit 20 by using a position at which numbers or letters constituting the authentication key corresponding to the toner refill kit 20 are arranged. Furthermore, the predetermined criterion may be a criterion meeting at least two of the first criterion, the second criterion, and the third criterion described above.

The processor 1240 may control a toner refilling operation of the toner refill kit 20 based on whether the toner refill kit 20 is genuine.

For example, when the toner refill kit 20 is genuine, the processor 1240 may proceed with the toner refilling operation of the toner refill kit 20. The processor 1240 may obtain first injection data indicating a capacity of toner injected by the toner refilling operation, based on a second electrical signal generated after the first electrical signal is generated in the toner refill kit 20. The processor 1240 may control the toner refilling operation of the toner refill kit 20 in accordance with the first injection data.

For example, when the toner refill kit 20 is not genuine, the processor 1240 may stop the toner refilling operation of the toner refill kit 20.

The operating method of the image forming device 10 and the toner refill kit 20 described above may be implemented in the form of a non-transitory computer-readable recording medium storing instructions or data executable by a computer or a processor. The examples may be written as computer programs and may be implemented in general-use digital computers that execute programs using the computer-readable recording medium. The computer-readable recording medium may include read only memory (ROM), random access memory (RAM), flash memory, CD-ROMs, CD-Rs, CD+Rs, CD-DVD-Rs, DVD-Rs, DVD-RWs, DVD+RWs, DVD-RAMs, BDROMs, BD-Rs, BD-R LTHs, BD-REs, magnetic tapes, floppy disks, magneto-optical data storage devices, optical data storage devices, hard disks, or solid-state disks (SSD), and may be any device capable of storing instructions or software, associated data, data files, and data structures, and providing the instructions or software, associated data, data files, and data structures to a processor or a computer such that the processor or computer may execute the instructions.

Although the examples have been described with reference to the accompanying drawings, those of ordinary skill in the art will understand that various changes and modifications may be made therein. For example, the relevant results may be achieved even when the described technologies are performed in a different order than the described methods, and/or even when the described components such as systems, structures, devices, and circuits are coupled or combined in a different form than the described methods or are replaced or substituted by other components or equivalents.

Therefore, the scope of the present disclosure should be defined not by the described examples alone, but by the appended claims and the equivalents thereof.

The invention claimed is:

1. A method of operating an image forming device, the method comprising:
   detecting a coupling of a first toner refill kit to the image forming device;
   receiving, from the first toner refill kit, a first electrical signal that varies with movement of a moveable member in the first toner refill kit;
   obtaining, by a processor based on the first electrical signal from the first toner refill kit, first authentication data corresponding to the first electrical signal;
   obtaining, by the processor, a first authentication key used to authenticate the first toner refill kit from the first authentication data;
   applying, by the processor, the first authentication key to a predetermined criterion used to determine a validity of an authentication key of a toner refill kit to confirm whether the first toner refill kit is genuine; and
   controlling, by the processor, a toner refilling operation of the first toner refill kit based on whether the first toner refill kit is genuine.

2. The method of claim 1, wherein the obtaining of the first authentication data corresponding to the first electrical signal comprises:
   obtaining the first electrical signal generated based on at least one pattern coated with an electroconductive material in the first toner refill kit; and
   obtaining, based on the first electrical signal, the first authentication data in which data corresponding to the at least one pattern is converted into a binary code.

3. The method of claim 1,
   wherein the first authentication data includes data encrypted with a first public key, and
   wherein the obtaining of the first authentication key used to authenticate the first toner refill kit from the first authentication data comprises:
   retrieving a first private key corresponding to the first public key from a memory of the image forming device; and
   decrypting the first authentication data by using the first private key to obtain the first authentication key.

4. The method of claim 1, wherein the applying of the first authentication key to the predetermined criterion used to determine the validity of the authentication key of the toner refill kit to confirm whether the first toner refill kit is genuine comprises:
   determining whether authentication information obtained from at least one number or letter constituting the first authentication key meets the predetermined criterion;
   determining, responsive to the authentication information meeting the predetermined criterion, that the first toner refill kit is genuine; and
   determining, responsive to the authentication information not meeting the predetermined criterion, that the first toner refill kit is not genuine.

5. The method of claim 4, wherein the predetermined criterion comprises at least one of:
   a first criterion for verifying an authentication key corresponding to the toner refill kit by using production schedule information of the toner refill kit;
   a second criterion for calculating values converted from numbers or letters constituting the authentication key corresponding to the toner refill kit according to a predetermined calculation algorithm and verifying the authentication key corresponding to the toner refill kit; or
   a third criterion for verifying the authentication key corresponding to the toner refill kit by using a position where the numbers or the letters constituting the authentication key corresponding to the toner refill kit are arranged.

6. The method of claim 1, wherein the controlling of the toner refilling operation of the first toner refill kit based on whether the first toner refill kit is genuine comprises:
   proceeding with the toner refilling operation of the first toner refill kit responsive to the first toner refill kit being genuine; and
   stopping the toner refilling operation of the first toner refill kit responsive to the first toner refill kit not being genuine.

7. The method of claim 6, wherein the proceeding with the toner refilling operation of the first toner refill kit responsive to the first toner refill kit being genuine comprises:
   obtaining first injection data indicating a capacity of toner injected by the toner refilling operation, based on a second electrical signal generated after the first electrical signal is generated by the first toner refill kit; and
   controlling the toner refilling operation of the first toner refill kit according to the first injection data.

8. The method of claim 1, wherein the moveable member is a plunger of the first toner refill kit, and the first electrical signal varies with movement of the plunger in the first toner refill kit.

9. The method of claim 1, wherein the first electrical signal is generated by a signal generator that moves with the moveable member.

10. The method of claim 9, wherein the signal generator detects an electrically conductive pattern of the first toner refill kit, wherein the electrically conductive pattern varies with location along a longitudinal direction of a body of the first toner refill kit, and wherein the first electrical signal varies with a variation of the electrically conductive pattern along the longitudinal direction.

11. A toner refill kit to supply toner to an image forming device, the toner refill kit comprising:
 a body having an inner space in which the toner is accommodated and a toner outlet through which the toner is discharged;
 a plunger to insert into the inner space so as to be movable in a longitudinal direction of the body;
 a discharge shutter to open and close the toner outlet; and
 a signal generator, operating in synchronization with movement of the plunger, to generate an electrical signal used to determine whether the toner refill kit is genuine according to the movement of the plunger.

12. The toner refill kit of claim 11, wherein the toner outlet is to open responsive to receipt of a signal indicating that a genuineness authentication of the toner refill kit is completed, wherein the plunger is to inject the toner through the opened toner outlet into the image forming device as the plunger moves in the longitudinal direction of the body.

13. The toner refill kit of claim 12, wherein the signal generator comprises:
 a support having a surface on which at least one pattern corresponding to an authentication key of the toner refill kit is applied in the longitudinal direction of the body, the pattern including an electroconductive material;
 a header to move along the surface of the support in synchronization with the movement of the plunger, and to generate the electrical signal by recognizing the at least one pattern; and
 a signal connector to transmit the electrical signal to the image forming device.

14. The toner refill kit of claim 13,
 wherein the header corresponds to the at least one pattern for recognizing the at least one pattern and comprises respective contacts formed of a conductor, and
 wherein portions of the header other than the contacts are formed of a nonconductor.

15. The toner refill kit of claim 13,
 wherein the plunger is designed to have a predetermined empty space from an upper end of the body,
 wherein, when the plunger passes through the empty space while moving in the longitudinal direction of the body, the toner is injected into the image forming device while the toner outlet is opened, and
 wherein the header moves along the surface of the support in synchronization with the movement of the plunger before the plunger passes through the empty space, and generates the electrical signal by recognizing the at least one pattern.

16. The toner refill kit of claim 13,
 wherein, as the plunger moves in a direction opposite to the longitudinal direction of the body, the header moves along the surface of the support in synchronization with the movement of the plunger, and generates the electrical signal by recognizing the at least one pattern, and
 wherein, as the plunger moves in the longitudinal direction of the body after moving in the direction opposite to the longitudinal direction of the body, the header moves along the surface of the support in synchronization with the movement of the plunger, and generates the electrical signal by recognizing the at least one pattern.

17. An image forming device comprising:
 a communication device to communicate with an external device;
 a processor to control operations of the image forming device;
 a non-transitory storage medium storing instructions executable on the processor to:
  detect a coupling of a first toner refill kit to the image forming device;
  receive, from the first toner refill kit, a first electrical signal that varies with movement of a moveable member in the first toner refill kit;
  obtain, based on the first electrical signal from the first toner refill kit, first authentication data corresponding to the first electrical signal;
  obtain a first authentication key used to authenticate the first toner refill kit from the first authentication data;
  apply the first authentication key to a predetermined criterion used to determine validity of an authentication key of a toner refill kit to confirm whether the first toner refill kit is genuine; and
  control a toner refilling operation of the first toner refill kit based on whether the first toner refill kit is genuine.

18. The image forming device of claim 17, wherein the instructions are executable on the processor to:
 authenticate whether the first toner refill kit is genuine based on the first electrical signal before the toner refilling operation is started using the first toner refill kit.

19. The image forming device of claim 17, wherein the first electrical signal is generated by a signal generator that moves with the moveable member.

20. The image forming device of claim 19, wherein the signal generator is to detect an electrically conductive pattern of the first toner refill kit, wherein the electrically conductive pattern varies with location along a longitudinal direction of a body of the first toner refill kit, and wherein the first electrical signal varies with a variation of the electrically conductive pattern along the longitudinal direction.

* * * * *